US009241599B2

(12) United States Patent
Cooper et al.

(10) Patent No.: US 9,241,599 B2
(45) Date of Patent: Jan. 26, 2016

(54) SLOTTED BATTER SPATULA

(71) Applicant: TONOGA INC., Petersburgh, NY (US)

(72) Inventors: John F. Cooper, Barrington, IL (US);
Sherry Wong, Honolulu, HI (US)

(73) Assignee: TONOGA INC., Petersburgh, NY (US)

( * ) Notice: Subject to any disclaimer, the term of this patent is extended or adjusted under 35 U.S.C. 154(b) by 29 days.

(21) Appl. No.: 14/174,743

(22) Filed: Feb. 6, 2014

(65) Prior Publication Data

US 2014/0220201 A1 Aug. 7, 2014

Related U.S. Application Data

(60) Provisional application No. 61/761,314, filed on Feb. 6, 2013.

(51) Int. Cl.
*A47J 43/28* (2006.01)
*A47L 17/06* (2006.01)

(52) U.S. Cl.
CPC ................ *A47J 43/288* (2013.01); *A47L 17/06* (2013.01)

(58) Field of Classification Search
CPC ..... A47J 43/288; A47L 13/02; A47L 13/022; A47L 13/08; A47L 17/00; A47L 17/04; A47L 17/06; A47L 25/00

USPC ......... 15/236.01, 236.05–236.09, 245; 294/7; D32/46, 49; D7/688
See application file for complete search history.

(56) References Cited

U.S. PATENT DOCUMENTS

| 2,256,650 | A | * | 9/1941 | Reid et al. ................. 15/245 |
| 2,280,225 | A | * | 4/1942 | Finely ..................... 15/245 |
| 5,175,933 | A | | 1/1993 | Shepherd |
| 5,491,869 | A | * | 2/1996 | Sullivan et al. ............ 15/245 |
| 5,794,996 | A | | 8/1998 | Mohabir |
| 2010/0229319 | A1 | | 9/2010 | Phillips |
| 2011/0191975 | A1 | | 8/2011 | Genatossio et al. |

* cited by examiner

*Primary Examiner* — Mark Spisich
(74) *Attorney, Agent, or Firm* — Heslin Rothenberg Farley & Mesiti P.C.; Andrew K. Gonsalves, Esq.

(57) ABSTRACT

The present disclosure relates to a utensil that can be used to manipulate batter. In one embodiment, the utensil is a slotted batter spatula that comprises: (i) an elongated handle comprising a front end and a back end; (ii) a fork-shaped head attached to the front end of the elongated handle, said fork-shaped head having at least two substantially parallel tines; and (iii) a slotted head cover mounted over the fork-shaped head so that a slot of the head cover extends between each of the substantially parallel tines of the fork-shaped head. The present disclosure also relates to a method of manipulating batter with the slotted batter spatula. This method involves using the slotted batter spatula to lift, spread, stir, scrape, move, and/or remove batter from one or more surface.

18 Claims, 5 Drawing Sheets

SLOTTED BATTER SPATULA

CROSS-REFERENCE TO RELATED APPLICATIONS

This application claims the benefit of U.S. Provisional Patent Application Ser. No. 61/761,314, filed Feb. 6, 2013, which is hereby incorporated by reference in its entirety.

FIELD OF THE INVENTION

The present invention relates to a slotted batter spatula and methods of use thereof.

BACKGROUND OF THE INVENTION

In the culinary arts, batter is an integral part of preparing numerous types of foods and food products. A mixing apparatus such as a mixer with beaters, blades, or other attachments is used to prepare the batter. Such mixing apparatuses also typically involve using a bowl to mix the ingredients that make up the batter. Once the batter is mixed and prepared according to its intended use, it is normally removed from the mixing apparatus and bowl for use in the final food preparation stages.

Depending on the recipe and intended use of the batter, the consistency of various types of batters can range in thickness and stickiness. However, in most cases, even after removing the batter from the mixing apparatus and bowl, remnants of the batter remain on various portions of the bowl and the mixing apparatus, mixers, blades, beaters, and other mixer/beater attachments. Further, for certain food preparations, the recipe may call for the batter to be spread out in a certain manner for the final preparation stage.

Although spoons and spatulas are normally used to manipulate batter in the food preparation arts, the currently available spoons and spatulas are inefficient and/or ineffective in removing batter from mixing bowls and mixing apparatuses such as mixers and their various beaters, mixing blades, and other mixing attachments. Therefore, there is a need for improved utensils such as a modified spatula that can be used to effectively remove batter from mixing apparatuses and their various surfaces, particularly those surfaces that are difficult to reach with traditional spoons or spatulas.

The present invention is directed to overcoming these and other deficiencies in the art.

BRIEF SUMMARY OF THE INVENTION

The present disclosure relates to a utensil that can be used to manipulate batter. The utensil can be used in any setting and on any surface for which manipulation of batter is desired. For example, the utensil can be used in kitchens in the home, restaurants, other commercial environments (e.g., commercial kitchens), and any other setting where there is a need to lift, spread, stir, scrape, and/or otherwise move or remove batter from one or more surface.

In one aspect, the present disclosure relates to a slotted batter spatula. In one embodiment, the slotted batter spatula comprises: (i) an elongated handle comprising a front end and a back end; (ii) a fork-shaped head attached to the front end of the elongated handle, said fork-shaped head having at least two substantially parallel tines; and (iii) a slotted head cover mounted over the fork-shaped head so that a slot of the head cover extends between each of the substantially parallel tines of the fork-shaped head.

In another aspect, the present disclosure relates to a method of manipulating batter with a slotted batter spatula. In one embodiment, this method comprises: (i) providing a slotted batter spatula according to the present disclosure; and (ii) using the slotted batter spatula to lift, spread, stir, scrape, move, and/or remove batter from one or more surface, wherein the one or more surface is selected from the group consisting of a flat surface, a curved surface, a mixer beater blade, a mixer paddle, a mixer beater attachment, and opposing sides thereof.

In particular embodiments, the present disclosure relates generally to composites and more specifically it relates to a slotted batter spatula for quick and easy yet very strong scraping down of mixer beater blades, particularly along both sides of an electric mixer paddle or beating attachment.

More particularly, the present disclosure relates to a composite which includes an ergonomically-designed ABS (acrylonitrile butadiene styrene) handle integrated with an inner stainless steel (or other rigid material such as, for example, nylon) pitchfork having a double slotted flexible, yet sturdy silicone head mounted thereon, with the assembled product being easy to clean (e.g., dishwasher-safe).

Various objects of the present disclosure are provided below, although the present disclosure is not meant to be limited to such objects.

An object of the present disclosure is to provide a slotted batter spatula for quick and easy yet very strong scraping down mixer beater blades, including down both sides of an electric mixer paddle or beating attachments.

Another object of the present disclosure is to provide a slotted batter spatula that is extremely strong so that it can handle even the thickest batter.

Another object of the present disclosure is to provide a slotted batter spatula that has flexible yet sturdy silicone slots to surround beater blades for effective scraping or removal of batter from the beater blades.

Another object of the present disclosure is to provide a slotted batter spatula that can rest (e.g., sit) on the lip of a mixing bowl using one of its slots, more particularly at an angle.

Another object of the present disclosure is to provide a slotted batter spatula that can be easily wiped clean, with one embodiment being made of silicone and ABS so as to be dishwasher-safe.

These and other objects, features, and advantages of this invention will become apparent from the following detailed description of the various aspects of the invention taken in conjunction with the accompanying drawings.

BRIEF DESCRIPTION OF DRAWINGS

For the purpose of illustrating aspects of the present invention, there are depicted in the drawings certain embodiments of the invention. However, the invention is not limited to the precise arrangements, dimensions, and instrumentalities of the embodiments depicted in the drawings. Further, as provided, like reference numerals contained in the drawings are meant to identify similar or identical elements.

FIG. 1A is an illustration of one embodiment of a slotted head cover of the slotted batter spatula of the present disclosure. FIG. 1B is an illustration of one embodiment of an elongated handle attached to one embodiment of a fork-shaped head of the slotted batter spatula of the present disclosure.

DETAILED DESCRIPTION OF THE INVENTION

Figures 1A, 1B:
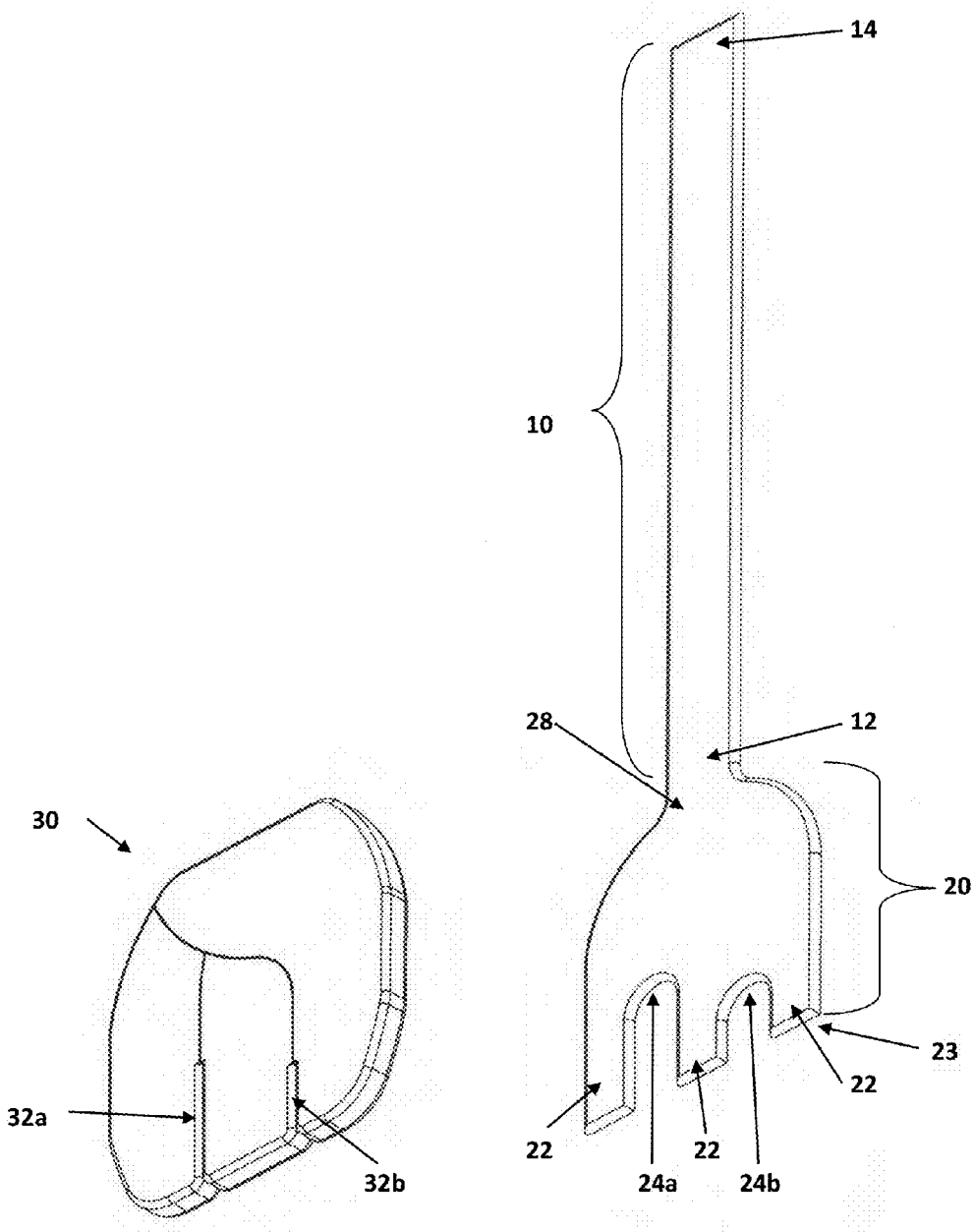
FIGS. 1A and 1B are drawings of one embodiment of the slotted batter spatula of the present disclosure.

The present disclosure relates to a utensil that can be used to manipulate batter. The utensil can be used in any setting and on any surface for which manipulation of batter is desired. For example, the utensil can be used in kitchens in the home, restaurants, other commercial kitchens, and any other setting where there is a need to lift, spread, stir, scrape, move, and/or remove batter from one or more surface.

In one aspect, the present disclosure provides a slotted batter spatula. In one embodiment, the slotted batter spatula comprises: (i) an elongated handle comprising a front end and a back end; (ii) a fork-shaped head attached to the front end of the elongated handle, said fork-shaped head having at least two substantially parallel tines; and (iii) a slotted head cover mounted over the fork-shaped head so that a slot of the head cover extends between each of the substantially parallel tines of the fork-shaped head.

In certain embodiments, the fork-shaped head and the elongated handle can either be formed as a single structure (e.g., a monolith) or as separate structures that fit together (e.g., molded together, welded together, attached together with an attachment such as a screw, or structures that can screw, snap, or otherwise attach to one another at their connecting ends).

As used herein, the term "fork-shaped head" refers to a head that includes at least two tines, which tines are commonly known as the prongs of a fork or of a fork-like structure. The fork-shaped head terminates at the tip of the tines on one end and has an opposing base end that is proximate to the front end of the elongated handle.

As described herein, the fork-shaped head has at least two substantially parallel tines, and in certain embodiments the tines are completely parallel. As used herein, the term "substantially parallel" is meant to include completely parallel tines as well as tines that are essentially parallel but that may vary in their distances from one another along their lengths so as not to be completely parallel along their lengths. The tines are parallel or substantially parallel so that a slot of the slotted head cover can extend between two parallel or substantially parallel tines. The number of tines included in the fork-shaped head can vary, but will include at least two tines per head so that the slotted head cover mounted on the fork-shaped head includes at least one slot positioned between the at least two tines. Therefore, in one embodiment, the fork-shaped head includes two substantially parallel tines so that the slotted head cover has one slot. In another embodiment, the fork-shaped head includes three substantially parallel tines so that the slotted head cover has two slots (see FIGS. 1A and 1B). In another embodiment, the fork-shaped head includes four substantially parallel tines so that the slotted head cover has three slots. In another embodiment, the fork-shaped head includes five substantially parallel tines so that the slotted head cover has four slots.

The length and collective orientation of the tines of the fork-shaped head can vary, depending on the desired structure. For example, in one embodiment, the tines of the fork-shaped head terminate at substantially the same distance away from the back end of the elongated handle. In another embodiment, the tines of the fork-shaped head terminate at variable distances away from the back end of the elongated handle. In yet another embodiment, the tines of the fork-shaped head terminate at uniformly graduated distances away from the back end of the elongated handle. As used to describe the orientation of the tines, the term "uniformly graduated" refers to each tine terminating at a position that is gradually longer than an adjacent tine on one side and terminating at a position that is gradually shorter than the adjacent tine on its other side. As one of ordinary skill in the art can readily understand such a uniformly graduated structure of a set of tines can then be used for mounting a slotted head cover that has an angled front edge.

In certain embodiments, the tines of the fork-shaped head that are adjacent to one another are spaced at their base by a gap portion defined by a recess into the head, where the recess can be of the same or different distance into the head for each gap portion. In a particular embodiment, the recess can be in the form of an arched structure (see FIG. 1B, which shows the arched recesses being of different distances into the head, but of the same width). In other embodiments, the recess can be a flat structure, a pointed structure, or any another structure. A corresponding slotted head cover can be formed to have slots that fit the structure and size of the gap portion of the fork-shaped head in terms of width and length of the slot between each tine.

The tines of the fork-shaped head can be spaced in equivalent or varied intervals from one another so that the slots of the slotted head cover between the tines are also spaced in equivalent or varied intervals, respectively.

In certain embodiments, the tines of the fork-shaped head terminate in the same or substantially the same distance from the back end of the elongated handle. In other embodiments, the tines of the fork-shaped head terminate in different distances from the back end of the elongated handle.

The fork-shaped head is rigidly constructed so as to maintain its form during use thereof. In certain embodiments, the fork-shaped head is made from a material that can include, without limitation, stainless steel, a synthetic polymer, a thermoplastic, or wood. With respect to the stainless steel material, it can be, without limitation, cast or forged stainless steel. With respect to the synthetic polymer, it can be, without limitation, a polymer such as nylon.

The fork-shaped head is either molded into the front end of the elongated handle or connected to the front end of the elongated handle with an attachment (e.g., a screw or any other type of fastener or attaching mechanism know in the art). In a particular embodiment, the fork-shaped head can further include an extension portion that connects the head to the elongated handle (e.g., screwed together, snapped together, etc.).

The slotted head cover is constructed so as to provide flexibility for efficient lifting, spreading, stirring, scraping, moving, and/or removing of batter from a surface or simultaneously from multiple surfaces (e.g., from multiple surfaces of the same mixing beater or blade). Along with the front edge, right edge, and left edge of the slotted head cover, the slots enable the user to use the slotted batter spatula to scrape and remove batter from beaters, mixers, single surfaces, planar surfaces, non-planar surfaces, curved surfaces, asymmetric surfaces, etc.

To aid in its functionality in manipulating batter as described herein, the slotted head cover comprises a sturdy, yet flexible material having the slots molded therein. Any material that provides such combined sturdiness and flexibility can be used to form the slotted head cover. In one embodiment, the slotted head cover is made of silicone having the slots molded therein.

In various embodiments, each slot of the slotted head cover has a form, length, and width to facilitate removal of batter simultaneously from two oppositely facing surfaces. For example, the slot of the slotted head cover can be formed so that a mixer blade can fit in the slot so that the sides of the slot still touch the mixer blade sufficiently to scrape batter from the mixer blade.

In various embodiments, at least one of the slots of the slotted head cover can have a form, length, and width to fit over an edge of a bowl for temporary storage during use of the spatula. In such embodiments, the slots have a width that provides sufficient side pressure against the edge of the bowl so that the slotted batter spatula remains in place on the bowl until the user removes it from that position. This feature enables the user to let go of the slotted batter spatula for other purposes while manipulating the batter.

As described herein, the slotted head cover is mounted on the fork-shaped head. In various embodiments, the slotted head cover has an internal geometry suitable for fitting the fork-shaped head therein in a stable manner. For example, this can be done by constructing the slotted head cover so that its internal geometry fits snugly around each tine of the fork-shaped head, as well as around each exposed portion of the fork-shaped head.

As provided herein, in various embodiments, the slotted head cover of the slotted batter spatula has a front edge, a base edge opposite of the front edge, a right edge, and a left edge opposite of the right edge, where the front edge is proximate to and covers the terminal end of the tines and the base edge is proximate to and covers the portion of the fork-shaped head opposite to the terminal end of the tines.

The base edge of the slotted head cover can have various structures. In one embodiment, the base edge is planar or substantially planar. In another embodiment, the base edge of the slotted head cover is formed as a raised lip (see FIG. 5). The raised lip structure of the base edge can be useful to facilitate collection of batter at the base edge and/or to assist in moving the batter forward when pushing the slotted batter spatula in a forward direction through the batter.

In certain embodiments, the fork-shaped head and slotted head cover are substantially planar (i.e., substantially flat). However, in other embodiments, the fork-shaped head can have a curved form like those of forks known in the art, with the corresponding slotted head cover molded to fit the curved form of the fork-shaped head.

With respect to the tines of the fork-shaped head, they can be substantially flat with terminal ends 23 that are straight-edged (see FIG. 1B), pointed, rounded, or any other shape. The tines can also be thin, moderate, or wide compared to the size of the fork-shaped head. Those of ordinary skill in the art can readily determine suitable widths between each tine so that the tines can provide adequate rigid, inner support for the mounted slotted head cover for the batter manipulation described herein.

In certain embodiments, the slotted head cover comprises one or more openings for removing and replacing the slotted head cover from its mounted position over the fork-shaped head. In certain embodiments, the slotted head cover is removable so it can be washed and/or so it can be used on different fork-shaped heads that are designed to be mounted by the slotted head cover. The one or more openings can be resealable (e.g, with a zipping mechanism or any other sealing/resealing mechanism know in the art).

The elongated handle can be of varying widths, lengths, and shapes. In one embodiment, the elongated handle is an ergonomically designed structure to fit comfortably in a user's hand. The elongated handle can be made of various materials known in the art for use with kitchen utensils such as spatulas. Suitable materials for use in the elongated handle can include, without limitation, a thermoplastic, plastic, rubber, wood, metal, and the like. In a particular embodiment, the elongated handle is made of a thermoplastic material such as acrylonitrile butadiene styrene (ABS). The elongated handle can be injection molded or assembled by hand and permanent glue. As with the other components of the slotted batter spatula, the elongated handle can be made of a material that is dishwasher safe.

The elongated handle can be provided in various sizes, including small, medium, and large sizes to accommodate all hand sizes, including male, female, adult, adolescent, and child hand sizes. The elongated handle can be of various colors and aesthetic designs. In certain embodiments, the elongated handle can have finger grooves, gripping materials deposited thereon, etc. In certain embodiments, the back end of the elongated handle can include a hole for storing the spatula by hanging it on a nail or hook using the hole, or for inserting a rope for hanging the spatula or for wrapping the rope around the wrist of the user. In certain embodiments, the elongated handle can be interchangeable with other fork-shaped heads, e.g., so they can be screwed or snapped together. This feature can be useful when users of differing hand sizes want to use the same fork-shaped head, because different size elongated handles can be used for a single fork-shaped head.

In another aspect, the present disclosure provides a method of manipulating batter with a slotted batter spatula. In one embodiment, this method comprises: (i) providing a slotted batter spatula according to the present disclosure; and (ii) using the slotted batter spatula to lift, spread, stir, scrape, move, and/or remove batter from one or more surface.

The one or more surface can include, without limitation, a flat surface, a curved surface, a mixer beater blade, a mixer paddle, a mixer beater attachment, etc., and opposing sides thereof.

The front, right, and left edges of the slotted head cover of the slotted batter spatula of the present disclosure can be used in the same manner as traditional spatulas. However, since the slotted batter spatula of the present disclosure also has at least one slot, the slotted batter spatula can further be used to manipulate batter on opposing surfaces such as those found on mixing blades, beater blades, and the like. Therefore, the slotted batter spatula can be used in a way so that the slotted head cover, particularly by way of the slots, engages with one surface or a plurality of surfaces simultaneously to scrape or remove batter therefrom. In a particular embodiment, the slotted batter spatula can be used to scrape or remove batter from one surface or simultaneously from two oppositely facing surfaces. For example, this can be done by moving the slot along a blade of a beater or mixer, thereby effectively removing batter simultaneously from the two oppositely facing surfaces of the blade.

Various aspects and embodiments of the slotted batter spatula of the present disclosure are illustratively shown in FIGS. 1-5.

Referring now to FIGS. 1A and 1B, in one embodiment, the slotted batter spatula of the present disclosure includes elongated handle 10 comprising front end 12 and back end 14; fork-shaped head 20 attached to front end 12 of elongated handle 10, with fork-shaped head 20 having three substantially parallel tines 22; and slotted head cover 30 for mounting over fork-shaped head 20 so that slots 32a and 32b of head cover 30 extends between each of the substantially parallel tines 22 of fork-shaped head 20.

Referring to FIG. 1B, in one embodiment, elongated handle 10 is attached at its front end 12 to base portion 28 of fork-shaped head 20. Further, in the embodiment shown in FIG. 1B, gap portions 24a and 24b are in the form of arches that recess into the head, with gap portion 24a recessing deeper into the head than gap portion 24b. Referring to FIG. 1A, slots 32a and 32b of slotted head cover 30 have a length that corresponds in relative scale to gap portions 24a and 24b of fork-shaped head 20, respectively.

Figure 2:
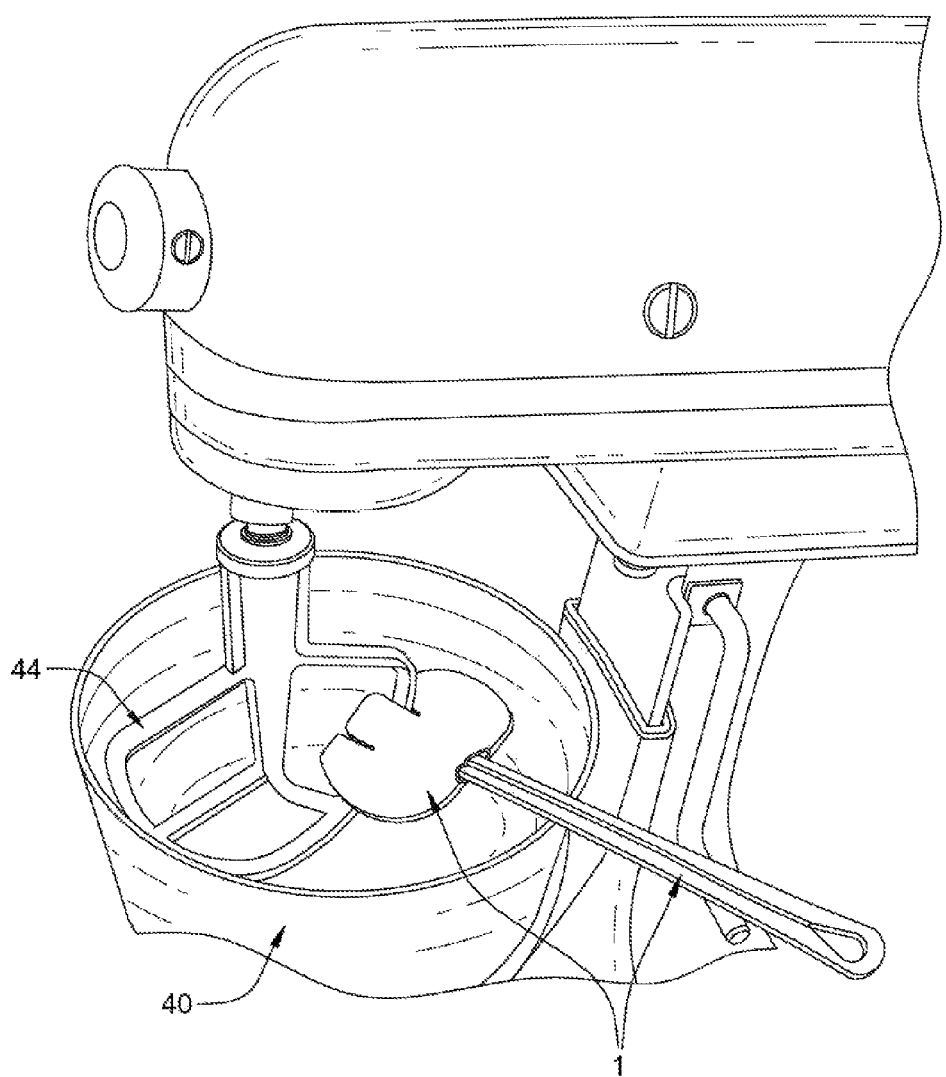
FIG. 2 is a perspective view of one embodiment of the slotted batter spatula of the present disclosure as it would be used to scrape or remove batter from a beater or blade of a mixing apparatus. As shown, the slotted head cover can fit from the side to enable scraping of batter off the side of a beater or blade.
Figure 3:
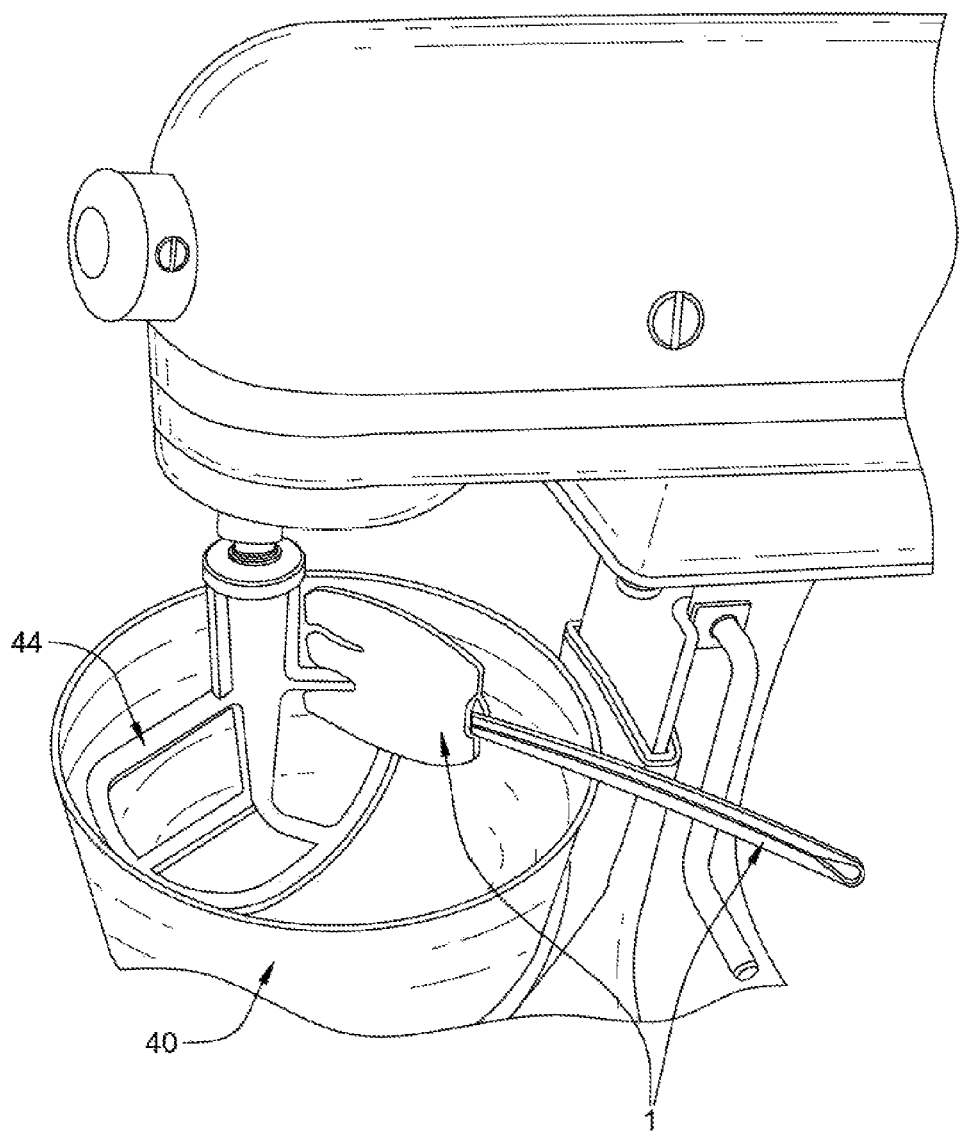
FIG. 3 is a perspective view of one embodiment of the slotted batter spatula of the present disclosure as it would be used to scrape or remove batter from a beater or blade of a mixing apparatus. As shown, the slotted head cover can be inserted vertically to enable scraping on top of the beater or blade.

Referring now to FIG. 2 and FIG. 3, there are shown various perspective views of one embodiment of slotted batter spatula 1 of the present disclosure with a slot surrounding a portion of beater blade 44 of a mixing apparatus (e.g., mixer), with mixing bowl 40 shown in its normal operating position for mixing batter.

Figure 4:
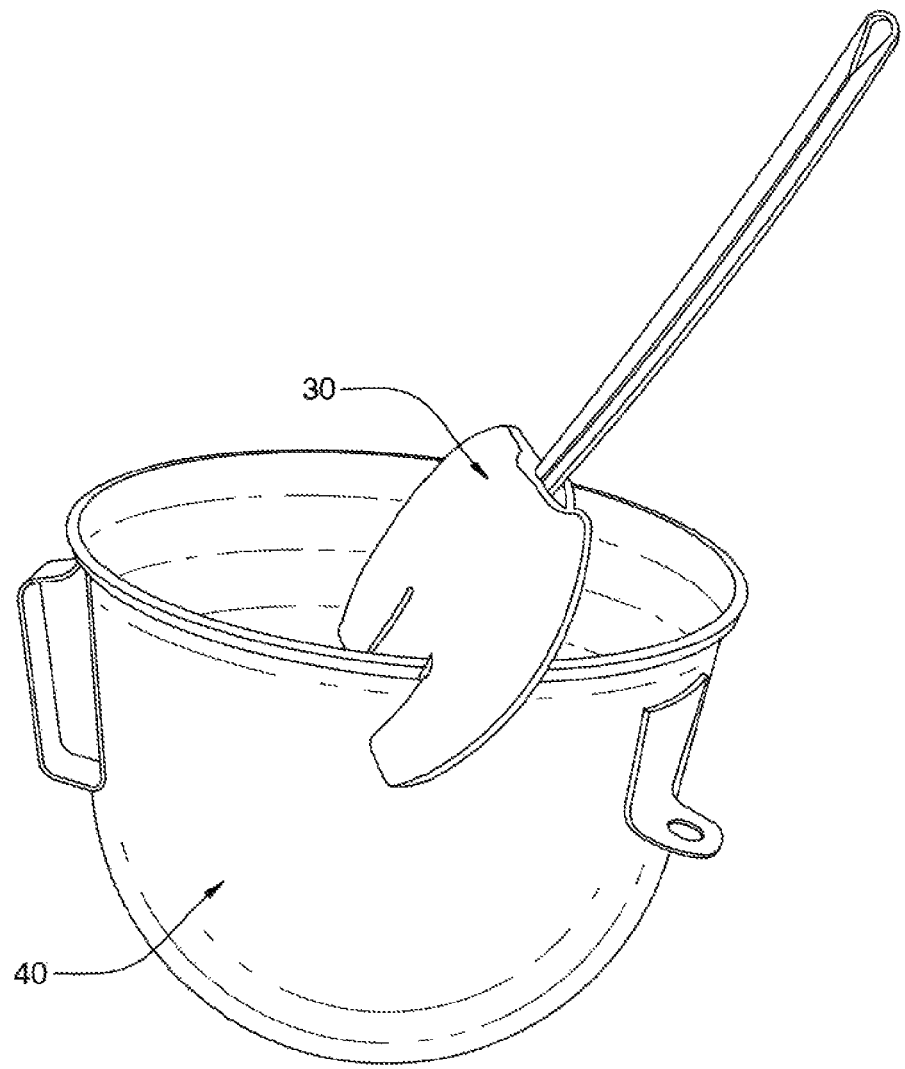
FIG. 4 is a perspective view of one embodiment of the slotted batter spatula of the present disclosure with the top lip of the mixing bowl being inserted into one of the slots of the slotted batter spatula, thereby allowing the spatula to rest on the bowl without making a mess.

Referring now to FIG. 4, there is shown a perspective view of one embodiment of slotted head cover 30 engaging the rim of mixing bowl 40. FIG. 4 shows one feature whereby the slotted batter spatula can rest at an angle of the rim of a bowl to free up the hand of the user.

Figure 5:
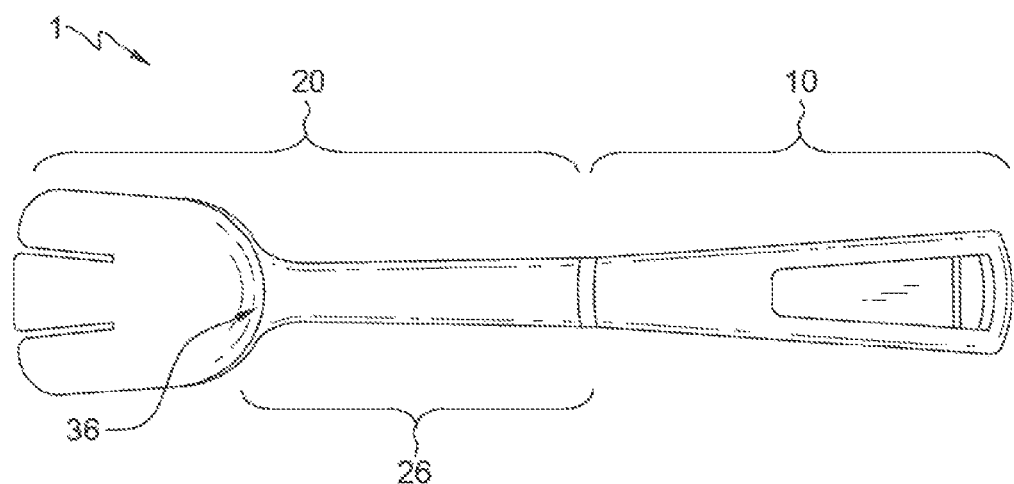
FIG. 5 is a top view of one embodiment of the slotted batter spatula of the present disclosure, with the embodiment being ergonomically designed with sturdy and easy-to-clean (dishwasher-safe) silicone-stainless steel-ABS components.

Referring now to FIG. 5, there is shown a perspective view of one embodiment of slotted batter spatula 1 of the present disclosure, where slotted head cover 20 has two slots and covers a fork-shaped head having three tines. Elongated handle 10 tapers from its back end to its front end and has a hold at its back end for storage purposes. Further, base edge 36 is in the form of a raised lip, as described herein. As shown, slotted head cover 20 further includes an extension portion 26 that attaches to elongated handle 10, and that can function as a part of the handle.

FIGS. 1-5 generally illustrate an embodiment of the slotted batter spatula of the present disclosure that includes an ergonomically-designed ABS handle integrated with an inner stainless steel or nylon pitchfork having a double slotted flexible, yet sturdy silicone head mounted thereon, where the assembled slotted batter spatula is easy to clean (e.g., dishwasher-safe).

For further illustrative purposes, a particular embodiment of the slotted batter spatula of the present disclosure is described as follows:

Ergonomically-Designed ABS Handle:

According to one embodiment, the elongated handle of the slotted batter spatula of the present disclosure can be designed to fit comfortably in a user's (e.g., a baker's) hand to work with even thick batters in an electric kitchen mixer. The elongated handle can be injection-molded and assembled by hand and permanent glue. Smaller or larger versions of the elongated handle can be used, depending on the end user or task (e.g., larger handles can be used for thicker batters). The elongated handle can be of varying colors and aesthetic designs.

Inner Stainless Steel or Nylon Pitchfork Construction:

According to one embodiment, the fork-shaped head of the slotted batter spatula can be of an inner pitch-fork shaped construction that is molded into the elongated handle and that attaches to a silicone slotted head cover (e.g., mounted with a silicone slotted head cover). If the fork-shaped head is stainless steel, it can be cast or forged stainless steel. The fork-shaped head can be of varied size to fit smaller or larger handles. The fork-shaped head can also be smaller or larger for desired weight differentiations according to the intended end user or use (e.g., type or thickness of batter).

Double Slotted Flexible, Yet Sturdy Silicone Head Cover:

According to one embodiment where there are three tines in the fork-shaped head, the slotted head cover can include two slots that are molded into sturdy, yet flexible silicone head cover structure. These slots are what make using the slotted batter spatula of the present disclosure to scrape batter off beater blades perform in a superior manner over existing spatulas. The slots can be placed in equivalent intervals if desired, but need not be so placed. The slots can be varied for special tasks. The color and aesthetics of the slotted head cover can also be varied according to desire. The slotted head cover can be differentiated according to design based on whether the user will be an adult, adolescent, or child, or a male or female.

With regard to the connections of the main elements and sub-elements of the slotted batter spatula of the present disclosure, the components are designed to integrate seamlessly in assembly. In certain embodiments, permanent adhesive and machine fastening can be utilized to manufacture the slotted batter spatula. Further, in view of the disclosure provided herein, those of ordinary skill in the art can readily determine how to manufacture and assemble the slotted batter spatula of the present disclosure. Further, various alternative embodiments of the slotted batter spatula of the present disclosure can be constructed for use by home consumers, commercial bakers, etc., which can include, without limitations, size variations for use by children or adults or adolescents.

In one particular embodiment, the slotted batter spatula of the present disclosure can be operated in a manner as described below. The slots in the unique slotted batter spatula allow the user to easily clean the blades of a beater without making a mess or sacrificing batter. With its ergonomically-designed ABS handled and the inner "pitch-fork" steel or nylon construction, the slotted batter spatula of the present disclosure can handle even the thickest batter in a mixing bowl. Whether lifting, spreading, stirring, scraping, moving, or removing batter, the sturdy slotted batter spatula is useful for all types of batter by all types of users, and in addition is made of dishwasher-safe materials.

Although various embodiments have been depicted and described in detail herein, it is apparent to those skilled in the relevant art, however, that many changes, variations, modifications, and other uses and applications are possible, and also that such changes, variations, modifications, and other uses and applications which do not depart from the spirit and scope of the invention are deemed to be within the scope of the invention as defined in the claims that follow.

What is claimed is:

1. A slotted batter spatula, said spatula comprising:
   an elongated handle comprising a front end and a back end;
   a fork-shaped head attached to the front end of the elongated handle and having a terminal free end, said fork-shaped head having at least three substantially parallel tines having free ends and with a gap portion formed in the head between each adjacent pair of tines, the free ends of the tines being located at said terminal free end and generally equidistantly spaced from the front end of the handle, each of the gap portions extending from the terminal free end toward the handle and substantially parallel to the other gap portion(s), the length of the gap portions being different; and a slotted head cover mounted over the fork-shaped head and including a plurality of slots corresponding to and aligned with respective gap portions of the head such that each slot of the cover extends between a respective pair of adjacent tines, and further wherein the length of the slots vary and correspond to the length of the gap portions.

2. The slotted batter spatula according to claim 1, wherein the fork-shaped head having at least three substantially parallel tines comprises:
  (a) three substantially parallel tines so that the slotted head cover has two slots; or
  (b) four substantially parallel tines so that the slotted head cover has three slots.

3. The slotted batter spatula according to claim 1, wherein the tines of the fork-shaped head are spaced in equivalent or varied intervals from one another so that the slots of the slotted head cover between the tines are also spaced in equivalent or varied intervals, respectively.

4. The slotted batter spatula according to claim 1, wherein the tines of the fork-shaped head terminate in the same or substantially the same distance from the back end of the elongated handle.

5. The slotted batter spatula according to claim 1, wherein the fork-shaped head is rigidly constructed so as to maintain its form during use thereof, and wherein the fork-shaped head is made from a material selected from the group consisting of stainless steel, a synthetic polymer, a thermoplastic, and wood.

6. The slotted batter spatula according to claim 1, wherein the fork-shaped head is either molded into the front end of the elongated handle or connected to the front end of the elongated handle with an attachment or further comprises an extension portion that connects the head to the elongated handle.

7. The slotted batter spatula according to claim 1, wherein the slotted head cover comprises a sturdy, yet flexible material having the slots molded therein.

8. The slotted batter spatula according to claim 1, wherein the slotted head cover is made of silicone having the slots molded therein.

9. The slotted batter spatula according to claim 1, wherein each slot of the slotted head cover has a form, length, and width to facilitate removal of batter simultaneously from two oppositely facing surfaces.

10. The slotted batter spatula according to claim 1, wherein at least one of the slots of the slotted head cover has a form, length, and width to fit over an edge of a bowl for temporary storage during use of the spatula.

11. The slotted batter spatula according to claim 1, wherein the slotted head cover has an internal geometry suitable for fitting the fork-shaped head therein in a stable manner.

12. The slotted batter spatula according to claim 1, wherein the slotted head cover has a front edge, a base edge opposite of the front edge, a right edge, and a left edge opposite of the right edge, wherein said front edge is proximate to and covers the terminal end of the tines and the base edge is proximate to and covers the portion of the fork-shaped head opposite to the terminal end of the tines.

13. The slotted batter spatula according to claim 12, wherein the base edge of the slotted head cover is formed as a raised lip so as to facilitate collection of batter at the base edge.

14. The slotted batter spatula according to claim 1, wherein the fork-shaped head and slotted head cover are substantially planar.

15. The slotted batter spatula according to claim 1, wherein the slotted head cover comprises one or more openings for removing and replacing it from its mounted position over the fork-shaped head.

16. The slotted batter spatula according to claim 1, wherein the elongated handle has an ergonomically designed structure to fit comfortably in a user's hand.

17. The slotted batter spatula according to claim 1, wherein the elongated handle is made from a material selected from the group consisting of a thermoplastic, plastic, rubber, wood, and metal, and wherein one thermoplastic material can comprise acrylonitrile butadiene styrene (ABS).

18. A method of manipulating batter with a slotted batter spatula, said method comprising:
  providing a slotted batter spatula according to claim 1; and
  using the slotted batter spatula to lift, spread, stir, scrape, move, and/or remove batter from one or more surface,
  wherein the one or more surface is selected from the group consisting of a flat surface, a curved surface, a mixer beater blade, a mixer paddle, a mixer beater attachment, and opposing sides thereof.

* * * * *